Nov. 4, 1969    L. M. H. KRAFFE DE LAUBAREDE    3,476,095
METHOD AND MEANS FOR FEEDING INTERNAL COMBUSTION ENGINES
Filed June 20, 1967                             3 Sheets-Sheet 1
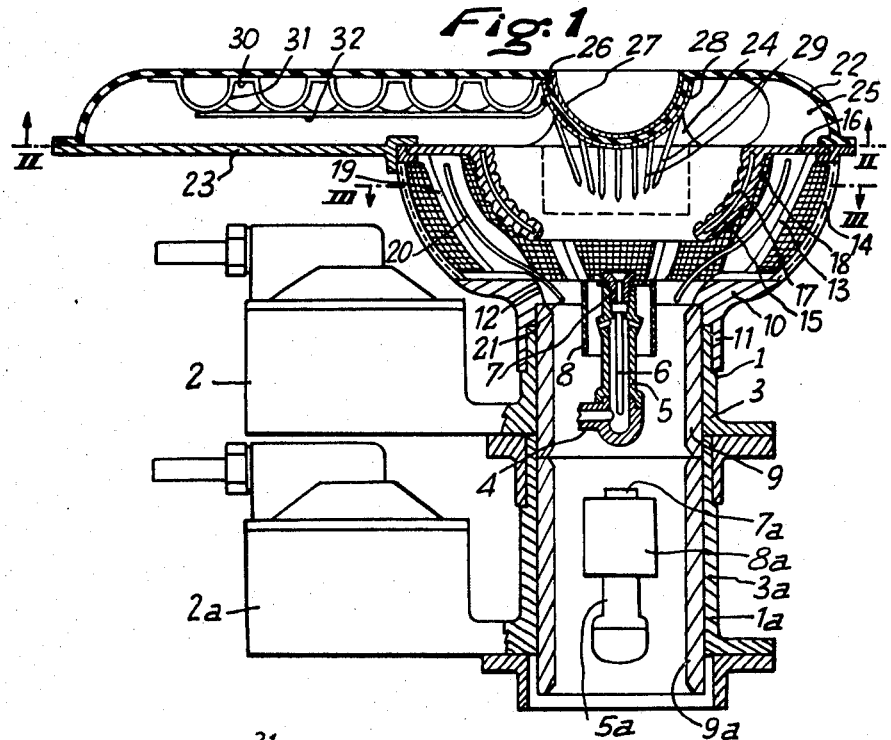
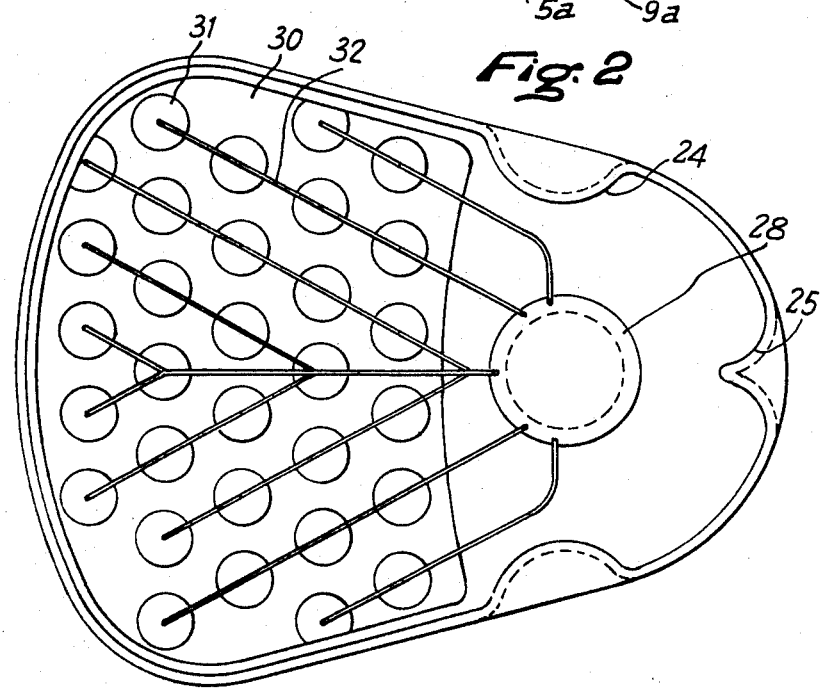
INVENTOR
LEONCE MARIE HENRI KRAFFE DE LAUBARE
KRAFFE DE LAUBAREDE
BY Young & Thompson
ATTYS.

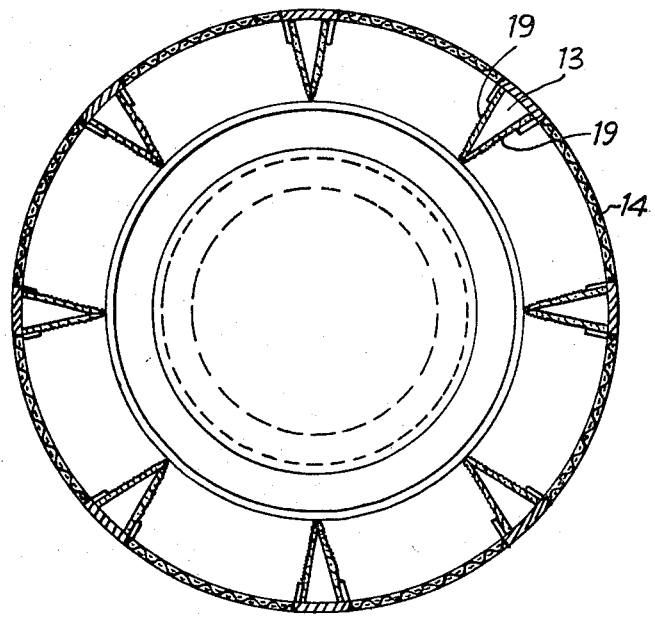

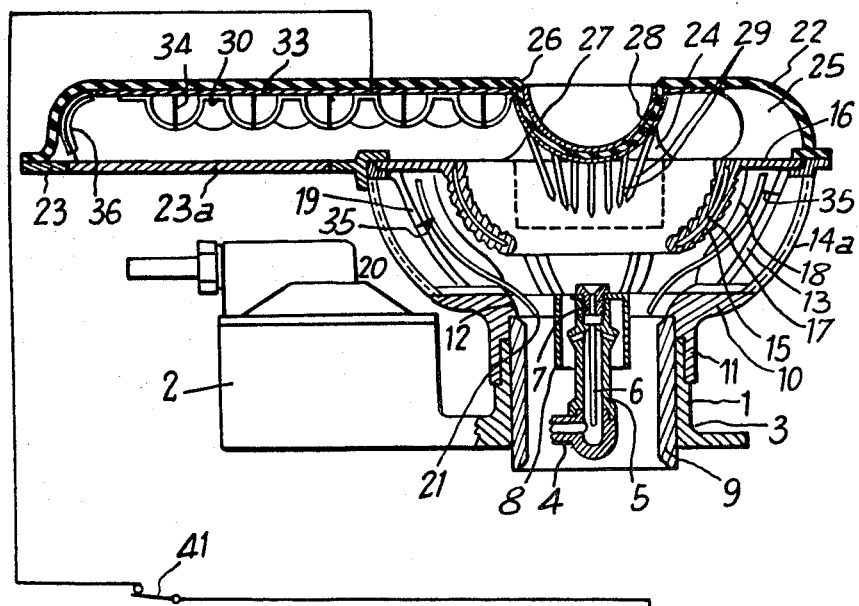
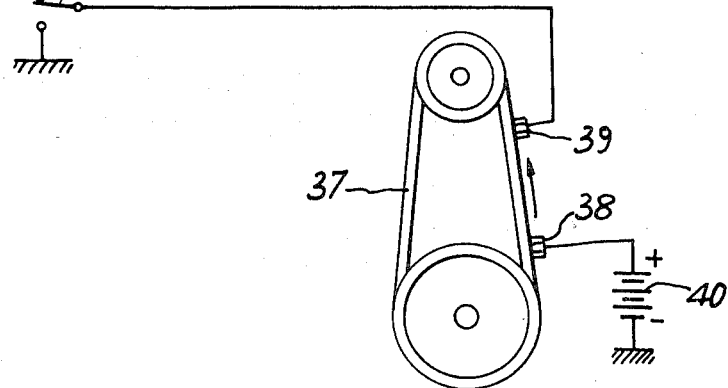
Fig. 4

United States Patent Office 3,476,095
Patented Nov. 4, 1969

3,476,095
METHOD AND MEANS FOR FEEDING INTERNAL COMBUSTION ENGINES
Leonce Marie Henri Kraffe de Laubarede, Boulogne-sur-Seine, France, assignor to Societe Anonyme Plastus, Geneva, Switzerland, a Swiss firm
Filed June 20, 1967, Ser. No. 647,512
Claims priority, application France, June 21, 1966, 66,316
Int. Cl. F02m 7/10; B03c 3/30, 3/40
U.S. Cl. 123—119                                7 Claims

ABSTRACT OF THE DISCLOSURE

A method for improving the yield of an internal combustion engine by applying a dark electrostatic discharge to the fuel-vaporizing stream of air. Said stream is caused to pass at a high speed over glass elements so as to produce by friction thereon static charges adapted to be fed to a system of points extending above the nozzle of a single or double carburetter.

---

My invention has for its object to improve the thermic yield of internal combustion engines by ensuring a better vaporization of the fuel as a consequence of the dissociation of the fuel, of an increase in the oxidizing capacity of the air and of a larger stability of the atomization provided by the carburetter.

Said invention is applicable to all engines provided with a single carburetter and fed with a light commercial gasoline and also to engines fed with a compound vaporized system including as a fuel a mixture of a light fuel and of a heavy atomized fuel, said mixture being obtained by resorting to a double carburetter, an upstream carburetter or preliminary carburetter adapted to atomize for high running speeds of the engine a heavy fuel, generally gas oil, into all or part of the stream of air while the second carburetter or main carburetter ensures the atomization with a partial vaporisation of the light fuel, generally gasoline, in the same sucked in stream of air.

The presence of a heavy fuel in the vaporized mixture shows numerous advantages and it allows in particular a reduction in the consumption of gasoline by the engine together with an increase in the compression ratio, while it ensures a complete combustion of the mixture of air and combustive gas as a consequence of a better ratio between the volumes of the air and carburetant gas in the mixture, owing to the presence of said dissociated heavy fuel.

In order to retain however good operative conditions for the combustion of the charge, that is a high speed of propagation of the flame, it is necessary both to produce a high turbulence in the combustion chamber and to retain a certain stratification for the charge, so that the rich mixture may extend in proximity with the sparking plug and enclose as much as possible the weak charge with a view to ensuring its speedy ignition when the pressure and temperature increase at the beginning of the explosion.

The method according to my invention consists in producing ahead and in the immediate vicinity of the carburetter nozzle or nozzles a dark electrostatic discharge within the vaporizing air stream.

Said discharge leads to an ionization of the air and produces in particular some ozone which causes in its turn a dissociation of the hydrocarbons and improves the combustion. Furthermore, the atomized droplets are electrically charged, which prevents their coalescence into the shape of large droplets.

In one embodiment of my invention, the air sucked in by the carburetter flows at a high speed in contact with glass members with a view to charging statically an electrostatic arrangement provided with points and extending axially of and above the carburetter nozzle.

According to a further feature of my invention, the electrostatic charging of the arrangement may be ensured at least partly and transiently by a belt driven by the engine and adapted to convey electrostatic charges between a source of electricity and collector connected electrically with the points system.

My improved arrangement includes chiefly a collector of air made of a di-electric insulating material incorporating glass members the surfaces of which are provided, in contacting relationship with the stream of air, with metal collecting parts leading to a hollow metal hemisphere carrying points and lying axially of the body of a carburetter in the vicinity of the input port of said carburetter of which the walls and inner components are made of a dielectric insulating material, while a section of the carburetter beyond the jets is made of a grounded conductive material, the hollow metal hemisphere being associated with a grounded plate forming with it a condenser. The large mass of air flowing at a high speed over and in contacting relationship with the surface of the glass members leaves in the latter the positive charges which are collected by the metal collecting parts or leads inserted at least partly in the surface of the glass members and feeding continuously the positive plate of the condenser, the latter being discharged continuously through a point effect, through the action of the points provided thereon, between the latter and the grounded metal section of the carburetter associated with the stream of fuel feeding said carburetter.

The arrangement comprises preferably a support for the air collector, said support made for instance of acetal resin being provided with ports for the direct admission of air and with sieves covering said ports, while a deflector also made for instance of acetal resin carries an inner metal reinforcement and is provided along its surfaces with recesses forming electrostatic traps for dust and the like particles, said deflector being fitted in the support of the air collector in substantially parallel relationship therewith so as to deflect downwardly the stream of air entering through the ports in the support of the air collector. The arrangement includes furthermore glass panes fitted radially in the section extending between the support and the deflector so as to be parallel with the direction of the stream of air, metal leads lying over the surface of said panes, collecting static electric charges and terminating each with a point directed towards the inside of the body of the carburetter, an air collector, of acetal resin for instance, fitted over the deflector, glass elements including projections and fitted in said air collector and further metal leads collecting static charges and lying in contact with the projections on said glass elements, said leads feeding a part spherical metal cap carried by the air collector and provided with points directed towards the axis of the deflector, while the part spherical cap is separated by a di-electric material from a second part spherical cap connected electrically with the body of the engine; said arrangement is connected with a carburetter of which the body is lined inwardly for instance with an acetal resin, the nozzle, jet and diffuser being all made of the same material.

With such an arrangement and assuming that the engine is idle, air is admitted chiefly through the lateral ports in the support, the points of the leads on the radial panes forming the seats of dark discharges ionizing either the air in the peripheral stream flowing through the single carburetter or else the stream of air feeding the main carburetter in the case of a double carburetter being used.

For large speeds of rotation on the contrary the stream of air in the air collector increases and loads positively the central condenser constituted by the part spherical cap and provided with points.

A dark discharge is thus produced between the condenser points and the stream of fuel or the metal support of the carburetter, the surfaces of the electrostatic trap constituted by the deflector being subjected to a negative charge by reason of the influence of the positive charges on the points of the condenser and on the reinforcement inserted in the deflector fitted in the air collector support.

According to a further feature of the invention, the hollow part spherical metal cap may be connected electrically under the control of a switch with a brush or comb located in the vicinity of a belt controlled by the engine and moving through a location in the vicinity of a second comb connected with the positive pole of a supply of D.C.

Further features of my invention will appear in the reading of the following description of an embodiment of a system for admitting air into the carburetter in conformity with my invention, reference being made to the accompanying drawings wherein:

FIG. 1 is a diagrammatic sectional view of the arrangement fitted on a double carburetter FIG. 2 is a sectional view through line II—II of FIG. 1.

FIG. 3 is a sectional view through line III—III of FIG. 1

FIG. 4 is a diagrammatic sectional view of a modification of the arrangement fitted on a single-body carburetter associated with an auxiliary electrostatic generator.

The arrangement illustrated in FIG. 1 is adapted to equip a double carburetter feeding an internal combustion engine with a mixture of commercial gasoline and gas oil. The elementary upstream carburetter designated generally by the reference number 1 is fed with gas oil, while the downstream carburetter designated generally by the reference 1a is fed with gasoline.

Each elementary carburetter is provided with a constant level vat 2–2a of a conventional metal type, of which the float is made for instance of acetal resin, said vat being carried by a strap surrounding the body 3–3a of the carburetter, which body is made of metal.

Channels, which are not illustrated, are provided in the parts rigid with said strap for feeding the fuel through a jet out of each constant level vat 2–2a to a corresponding diffuser-carrying member 4–4a also made of metal. In each elementary carburetter the diffuser 5–5a, the emulsifying tube 6–6a, the automatic jet 7–7a, the diffuser nozzle 8–8a and the automatic nozzle 9–9a are made of a di-electric material, preferably acetal resin.

The arrangement forming the object of my invention includes a support 10 for the air collector 22–23, which support is made for instance of acetal resin and includes a lower sleeve 11 adapted to be fitted in the upper end of the body 3 of the carburetter over which it is clamped by a collar which is not illustrated. The inner surface 12 of the support 10 which lies just above the sleeve 11 is shaped so as to merge into the inner wall of the automatic nozzle 9, whereby the Venturi effect is increased. The wall 13 of the upper part of the support forms substantially a part spherical area on said support 10 and is provided with gates or ports carrying sieves 14 adapted to prevent the entrance of any foreign particles.

A deflector 15 is fitted inside said collector support 10 and includes a peripheral flange 16 of which the edge is fitted between the air collector 22–23 and the upper edge of its support. At the center of said flange, the actual deflector is constituted by a substantially part spherical cap of which the upper diametrical plane extends through the flange, the plane of its lower opening of a small radius being aligned with the upper end of the automatic nozzle of the carburetter.

The body of the deflector is made for instance of acetal resin, but a metal cap 17 is embedded in the cap-shaped section of the deflector so as to insulate it electrostatically and to prevent the production on its opposite surfaces of charges of opposite signs. Both surfaces of the cap 15 are provided with recesses 18 and form dust-collecting electrostatic traps.

Inside the annular space separating the upper wall 13 of the support 10 from the outer surface of the deflector 15, there are inserted glass panes 19 extending in a substantially radial direction and defining passageways for the air entering through the gates or ports formed in the wall 13. Said substantially radial panes are adapted to produce through the rubbing of air flowing over them positive charges which are collected on their surface by strips 20 of a conductive metal, said strips terminating at their lower ends with points 21 directed, through the space separating the diffuser nozzle 8 from the automatic nozzle 9, towards the input of the nozzle 8a of the second carburetter.

The air collector carried by the support constituted by a body of acetal resin for instance includes an upper section in the shape of an inverted dish of a generally triangular shape when seen in plan view, said upper section cooperating with a lower plate 23 provided with ports protected by sieves. Said collector body is fitted on the upper end of the collector support 10. The upper surface of the plate 23 is provided preferably with a slope directly downwardly towards the ports so as to prevent any condensation. The upper section 22, made of molded acetal resin for instance, is provided with inner lateral bosses 24 adapted to give some turbulence to the stream of air before it enters the deflector, while the end of the air collector capping the deflector is provided with a shaped guiding wall 25 which deflects the stream of air and causes it to enter axially the carburetter. The upper section 22 of the air collector forms in its portion registering with the carburetter axis a thin downwardly bulging part spherical cap 26. A cap 27 fitted over the concavity of said first part spherical cap is grounded. The opposite convex surface of the air collector cap carries a further metal cap 28 of which the lower convex surface carries points 29 directed towards the automatic jet 7 of the carburetter 1.

The inner surface of the upper section 22 of the air collector lying above the ports in the laterally projecting part of the plane 23 carries the electrostatic generator. Said generator is constituted by a thin pane of glass 30 provided with hemispherical bosses 31. Conductive leads 32 in contact with the apices of the bosses 31 are connected electrically with the part spherical metal cap 28.

The operation of the arrangement is as follows:

For low running speeds of the engine, the air is sucked in chiefly by the ports in the wall 13 of the collector support 10 and only the gasoline carburetter 1a is operative. Said stream of air rubs over the glass panes 19 and the charges produced thus on the panes 20 produce through a point effect a dark discharge between the points 21 and the grounded mass constituted by the support of the diffuser 4a associated with a stream of fuel. This leads to an acceleration of the stream of air towards the diffuser nozzle, together with an ionization of the air and an electric charging of the droplets atomized by the carburetter 1a.

For high running speeds of the engine, the same phenomena appear, but furthermore the very high suction exerted by the difference in pressure obtained results in that a very large volume of air flows at a high speed through the air collector in contact with the surface of the glass pane 30 and of its bosses. The positive electrostatic charges which appear on the latter are fed by the leads 32 to the cap 28 of the condenser 26, 27, 28 and the static electricity is discharged continuously by the points 29. Consequently, the point effect accelerates the stream of air and directs it towards the jet 7 and the nozzle 8, which produces an ozonisation through ionisation of said air and charges electrostatically the atomized droplets of heavy fuel.

In the embodiment illustrated in FIG. 4, the elements similar to those forming part of the precedingly disclosed embodiment are designated by the same reference numbers and need not be described with any further detail. It should be remarked that the arrangement is fitted on a single carburetter fed with gazoline. The arrangement illustrated in FIG. 4 differs from that precedingly described by the fact that the leads 32 collecting the static charges appearing on the part spherical bosses 31 are replaced by a conductive blade 33 extending between the thin glass pane 30 and the upper section 22 of the air collector. Said blade 33 lies in contacting relationship with the part spherical metal cap 28 and carries points 34 extending through the apices of the part-spherical bosses 31.

According to a further modification, the sieves at 14a and 23a are formed by stems aof glass fibres inside which conductive leads are embedded so as to form a network absorbing the static charges appearing on the glass fibres and feeding said charges through the leads 35 and 36 respectively to the points 20 and to the conductive blade 33.

Lastly, the embodiment illustrated in FIG. 4 incorporates an auxiliary support of static electricity as provided in the example illustrated by the belt 37 driven by the engine and cooperating with two collecting brushes 38 and 39. The brush 38 on the upstream side in the direction of progression of the belt is connected with the positive pole of a supply of D.C. electricity 40, while the downstream brush 39 is connected through a reversing switch 41 with the part spherical cap 28 of the condenser 26, 27, 28. It is thus possible when the speed of the air stream on said glass elements is not sufficient, to resort to the auxiliary supply of static electricity for feeding the generator of dark discharges.

The embodiments of the arrangement described hereinabove may be subjected to numerous modifications without widening the scope of my invention and the materials forming the different parts of my arrangement may differ from those referred to hereinabove, provided they show similar dielectric and electrostatic properties.

What I claim is:
1. In a method for feeding a fuel, with a stream of air into the carburetter of an internal combustion engine, the steps of forming ahead of and immediately above the carburetter opening a dark electrostatic discharge within the stream of air, and flowing the stream of air over glass elements to form frictionally thereon electric charges to be transferred through a point effect to the fuel and air inside the carburetter.

2. An arrangement for feeding air admixed with fuel comprising a carburetter the inside of which is made of insulating dielectric material, a hollow elongated air collector made of an insulating dielectric material provided with air intake ports and opening into the carburetter, glass elements carried inside said air collector and extending along the path of the air streaming through the latter towards the carbureter, electric leads extending over the surfaces of said glass elements facing the stream of air, a pointed system fitted inside the air collector in registry with the carburetter and leads electrically connecting the surface of the glass elements facing the stream of air with said points to discharge the charges formed by the friction between the stream of air and the glass elements towards the carburetter.

3. An arrangement as claimed in claim 2, wherein the carburetter includes an outer grounded section and the pointed system includes a hollow metal part spherical cap carrying outwardly radial points facing the carburetter and the inside of which is lined with an insulating layer and a second grounded hollow metal part spherical cap forming with the first-mentioned cap and its lining a condenser.

4. An arrangement as claimed in claim 2, comprising a support of an insulating dielectric material inserted between the carbureter and the air collector and provided with further air intake ports, a deflector of an insulating dielectric material fitted inside said support with a clearance therebetween and underneath the pointed system and provided superficially with dust-trapping recesses, a metal cap-shaped shield fitted within said deflector, further glass elements fitted radially between the outer surface of the deflector and the inner surface of the support along the path of the air entering the ports in the support and flowing towards the carbuetter, further leads extending over the surface of said further elements, adapted to collect the static charges formed by the friction between the stream of air and said further elements and including points facing the carburetter and through which said static charges are projected into the carburetter.

5. An arrangement as claimed in claim 2, comprising a support of an insulating dielectric material inserted between the carburetter and the air collector and provided with further air intake ports, a deflector of an insulating dielectric material fitted inside said support with a clearance therebetween and underneath the pointed system and provided superficially with dust-trapping recesses, a metal cap-shaped shield fitted within said deflector, further glass elements fitted radially between the outer surface of the deflector and the inner surface of the support along the path of the air entering the ports in the support and flowing towards the carburetter, further leads extending over the surface of said further elements, adapted to collect the static charges formed by the friction between the stream of air and said further elements and including points facing the carburetter and through which said static charges are projected into the carburetter and sieves of glass fibres fitted inside the air intake ports and further air intake ports and enclosing leads electrically connected with the corresponding leads and further leads.

6. An arrangement as claimed in claim 2, comprising an independent supply of static charges and means adapted to feed said charges to the pointed system.

7. An arrangement as claimed in claim 2, comprising an independent supply of static charges, an engine-driven belt, a front and a rear brush engaging said belt, means feeding the rear brush with D.C. and a switch-controlled circuit tapping off the charges conveyed by the belt from the rear to the front brush to feed said charges to the pointed system.

References Cited

UNITED STATES PATENTS

| | | |
|---|---|---|
| 892,378 | 6/1908 | Martini. |
| 1,459,306 | 6/1923 | Kodama _____ 123—119 |
| 1,725,661 | 8/1929 | McPartland. |
| 1,771,626 | 7/1930 | Hamilton. |
| 2,146,265 | 2/1939 | Moore _____ 123—119 XR |
| 2,780,009 | 9/1953 | Stickel _____ 55—103 X |
| 3,053,028 | 9/1962 | Kayko _____ 55—103 |

FOREIGN PATENTS

| | | |
|---|---|---|
| 701,975 | 1/1954 | Great Britain. |
| 714,015 | 8/1954 | Great Britain. |

AL LAWRENCE SMITH, Primary Examiner

U.S. Cl. X.R.

55—103, 155; 261—1, 75